(12) United States Patent
Zeller (10) Patent No.: US 11,273,492 B2
(45) Date of Patent: Mar. 15, 2022

(54) SINTERED POROUS MATERIAL HAVING NODES AND FIBERS OF DIFFERENT MATERIALS, WITH DIFFERENT SINTERING POINTS, AND RELATED METHODS OF PREPARATION AND USE

(71) Applicant: ENTEGRIS, INC., Billerica, MA (US)

(72) Inventor: Robert S. Zeller, Boston, MA (US)

(73) Assignee: ENTEGRIS, INC., Billerica, MA (US)

( * ) Notice: Subject to any disclaimer, the term of this patent is extended or adjusted under 35 U.S.C. 154(b) by 0 days.

(21) Appl. No.: 16/762,421

(22) PCT Filed: Nov. 2, 2018

(86) PCT No.: PCT/US2018/059025
§ 371 (c)(1),
(2) Date: May 7, 2020

(87) PCT Pub. No.: WO2019/094300
PCT Pub. Date: May 16, 2019

(65) Prior Publication Data
US 2021/0069792 A1    Mar. 11, 2021

Related U.S. Application Data

(60) Provisional application No. 62/583,137, filed on Nov. 8, 2017.

(51) Int. Cl.
*B22F 7/00* (2006.01)
*B22F 3/11* (2006.01)
*B22F 1/00* (2022.01)
*C22C 47/14* (2006.01)

(52) U.S. Cl.
CPC ............ *B22F 3/1103* (2013.01); *B22F 1/004* (2013.01); *B22F 1/0011* (2013.01); *B22F 1/0014* (2013.01); *C22C 47/14* (2013.01); *B22F 2301/15* (2013.01); *B22F 2301/35* (2013.01); *B22F 2304/10* (2013.01); *Y10T 428/12056* (2015.01)

(58) Field of Classification Search
None
See application file for complete search history.

(56) References Cited

U.S. PATENT DOCUMENTS

| | | | |
|---|---|---|---|
| 3,127,668 A | 4/1964 | Troy | |
| 5,679,041 A * | 10/1997 | Sokol | B22F 3/22 442/59 |
| 5,788,737 A * | 8/1998 | Wakiyama | C22C 1/0416 75/249 |
| 6,346,168 B1 * | 2/2002 | Kinsley, Jr. | C22C 47/14 162/145 |

(Continued)

FOREIGN PATENT DOCUMENTS

| | | |
|---|---|---|
| CN | 102179105 B | 11/2013 |
| GB | 1028762 A | 5/1966 |

(Continued)

*Primary Examiner* — Seth Dumbris
(74) *Attorney, Agent, or Firm* — Entegris, Inc.

(57) ABSTRACT

Described are porous sintered metal bodies, methods of making and using the porous sintered metal bodies, and methods of using the porous sintered metal bodies for commercial applications that include filtering a fluid, including in applications requiring high efficiency (high LRV) filtration.

14 Claims, 5 Drawing Sheets

(56) References Cited

U.S. PATENT DOCUMENTS

| | | | |
|---|---|---|---|
| 6,964,817 B2 * | 11/2005 | Date | ................. B01D 39/2037 |
| | | | 428/304.4 |
| 8,673,065 B2 | 3/2014 | Burgess | |
| 2012/0135142 A1 | 5/2012 | Yang | |
| 2013/0305673 A1 * | 11/2013 | Zeller | ................ B01D 39/2034 |
| | | | 55/523 |
| 2014/0271325 A1 * | 9/2014 | Schuh | .................... C22C 1/045 |
| | | | 419/30 |
| 2016/0008888 A1 | 1/2016 | Yang | |
| 2018/0161880 A1 | 6/2018 | Gao | |

FOREIGN PATENT DOCUMENTS

| | | | |
|---|---|---|---|
| JP | 5884905 | A | 5/1983 |
| JP | 6184351 | A | 4/1986 |
| JP | 04176804 | A | 6/1992 |
| JP | 2016194116 | A | 11/2016 |
| WO | 9014224 | W | 11/1990 |

* cited by examiner

SINTERED POROUS MATERIAL HAVING NODES AND FIBERS OF DIFFERENT MATERIALS, WITH DIFFERENT SINTERING POINTS, AND RELATED METHODS OF PREPARATION AND USE

CROSS-REFERENCE TO RELATED APPLICATION

This Application is filed under the provisions of 35 U.S.C. § 371 claiming priority to International Patent Application No. PCT/US2018/059025 filed on Nov. 2, 2018, which further claims the benefit of and priority to U.S. Provisional Application No. 62/583,137 filed on Nov. 8, 2017, the entirety of which is incorporated herein by reference for all purposes.

FIELD OF THE INVENTION

The described invention relates to technologies in the field of porous sintered metal bodies, methods of making and using the porous sintered metal bodies, and methods of using the porous sintered metal bodies for commercial applications that include filtering a fluid, including in applications requiring high efficiency (high LRV) filtration.

BACKGROUND

Porous, sintered metal bodies find use in a variety of applications, including filtering of materials used in the electronics and semiconductor manufacturing industries, as well as other industries that require highly pure materials for processing. For example, in the semiconductor and microelectronics industries, inline filters are often used to remove particulate matter from fluids to prevent introduction of the particulate matter into a manufacturing process. The fluid may be in the form of a gas or a liquid.

Some examples of porous sintered bodies have been described for use in filter applications. Certain examples of these sintered bodies are prepared by using a mold to form a shaped article that includes metal particles and organic binder. The shaped article is removed from the mold, treated to remove the organic binder, followed by heating (i.e., sintering). See, e.g., U.S. Pat. Nos. 6,964,817 and 7,195,735. Another example of a porous sintered body, prepared by sintering metal fiber materials, is described in U.S. Pat. No. 8,673,065 (Assigned to Mott Corporation).

SUMMARY

While various examples of porous sintered bodies have been developed for use to filter flows of industrial fluids, including gaseous fluids, the changing demands of industrial processing continue to increase the performance requirements of these types of filters and filtering methods. Semiconductor and microelectronic devices continue to be developed into smaller and faster products. Producing each next generation of these devices can increase the need for higher levels of purity and lower levels of contaminants in raw materials.

Various features of porous sintered bodies are considered to affect the usefulness of the porous body as a filter. In filtering gaseous materials for use in semiconductor processing, the gaseous fluid may be supplied at a pressure that is approximately atmospheric (e.g., under 2 atmospheres), or below atmospheric pressure (e.g. vacuum conditions). The process that uses the gaseous fluid may require a very high removal rate of micron-scale particles, e.g., at least 3, 4, 5, 7, or 9 as measured by "log reduction value" (LRV) of a filtering step. The process of filtering these gaseous materials also may be performed at relatively low flow-rates, e.g., below 10, 5, or 2 standard liters per minute (slpm). As a general matter, for these and similar uses, a filter that is highly porous and has a reduced thickness (with comparable removal efficiency) can be preferred relative to a less porous or thicker body. A relatively thinner filter body, also having a lower total surface area (as measured by BET), can be preferred due to a relatively lower pressure drop that will occur across the body during filtering as compared to a pressure drop of a similar filter with a greater thickness. Pressure drop is directly proportional to thickness of the filter body. A relatively thinner filter body, as well as an absence of organic material in the sintered body, also result in a reduced potential for outgassing, which can occur if organic materials are present in a filter, e.g., due to the use of an organic binder. A larger, i.e., thicker, filter body can generally require an increased complexity and cost of the body, and typically has a greater mass. A higher porosity filter body is preferred over a lower porosity filter body (given comparable removal efficiency), also because pressure drop is exponentially proportional to porosity.

According to the present description, novel and inventive porous sintered bodies have been identified and produced, and have been found to be useful as a gas filtration media (i.e., a porous filter body). The inventive porous sintered bodies can be effective in filtering a gaseous flow of fluid with a low pressure drop, while retaining sub-micron filtration capability. The porous filter bodies can be useful to achieve high LRV values of at least 3, 5, 7, or 9, at various relatively low gas velocities.

In one aspect, the invention relates to a porous sintered metal body that includes an interconnected metal matrix comprising metal fibers connected at connective metal nodes. The matrix includes: connective metal nodes comprising a first metal material having a first sintering point; and elongate metal fibers of a second metal material having a second sintering point that is greater than the first sintering point. The connective metal nodes are fused to the elongate metal fibers to form an interconnected metal matrix comprising the elongate metal fibers connected by and extending between the connective metal nodes.

In another aspect, the invention relates to methods of using a porous sintered metal body as described, as a filter.

In yet another aspect, the invention relates to a method of forming a metal matrix as described. The method includes: providing a blend of metal materials that includes: powdered metal particles of a first metal material having a first sintering point; and elongate metal fiber particles of a second sintering point having a second sintering point, the second sintering point being above (higher than) the first sintering point. The method also includes sintering the blend at a temperature that is above the first sintering point to form a metal matrix comprising the elongate metal fibers connected at connective metal nodes formed by sintering the powdered metal material.

In another aspect the invention relates to a blend of metal materials that includes: powdered metal particles having a first sintering point, and elongate metal fiber particles of a second metal material having a second sintering point. The second sintering point is above the first sintering point, and the blend has an apparent density of less than 0.6 grams per cubic centimeter.

DETAILED DESCRIPTION

Presently described are novel porous sintered bodies that are effective for use as filter bodies for filtering various fluid flows. The porous sintered bodies include a porous, metal matrix made of elongate metal fibers connected by and extending between connective metal nodes. The connective metal nodes are formed within the matrix and attached to the elongate metal fibers by sintering, so that the connective metal nodes are effective to hold the metal fibers and the connective metal nodes together in the form of the fibrous matrix. Also described are novel and inventive methods for preparing the porous sintered bodies, and novel and inventive methods of using the porous sintered bodies in applications that include using a porous sintered body as described for filtering a flow of fluid.

A porous sintered body as described includes a metal matrix (or simply "matrix") that includes (e.g., comprises, consists of, or consists essentially of) elongate metal fibers connected together (e.g., "interconnected") by connective metal nodes of sintered metal material. The connective metal nodes are fused or bonded to the elongate fibers by a method that includes sintering a blend of metal materials that includes elongate metal fiber particles and metal powder particles. The blend is sintered to form the matrix, which, after sintering, includes the elongate metal fibers extending between connective metal nodes that are formed by sintering the blend, containing the two different types of particles, to cause the metal powder particles to become fused to the elongate metal fiber particles.

The term "sintering" as used herein has a meaning that is consistent with the meaning that this term is given when used in the arts of porous sintered metal structures, such as porous sintered metal membranes of the type that may be used as a metal filter membrane. Consistent therewith, the term "sintering" can be used to refer to processes of bonding (e.g., "welding" or "fusing") together a collection of small particles of one or more different types (sizes, compositions, shapes, etc.) of metal materials by applying heat and optional pressure to the particles so that the particles reach a temperature that causes at least one of the one or more metal materials to reach a temperature that is sufficiently high to cause the heated particles to become fused together, i.e., welded together, by a metal bond, but that does not cause any of the particles to melt (i.e., none of the metal materials reaches its melting temperature). The process allows for the formation of a porous mass of metal material by heating the metal material without melting the metal to the point of liquefaction. The metal being sintered is heated to a temperature at which the metal can become fused to other metal particles, without melting, to form a solid piece of fused metal particles when the heat is removed. As used herein, a "sintering point" of a metal material is a temperature at which the metal material is capable of being sintered, i.e., a temperature at which particles of the metal material begin adhering to other particles of the metal material and can be fused to another particle of the same metal material or of a different metal material, e.g., at a particular pressure such as at atmospheric pressure; a sintering point of a metal material is normally below a melting temperature of the metal, meaning the temperature at which the metal becomes liquid.

According to the present description, the connective metal nodes are made of a first metal material that has a "first sintering point," and the elongate metal fibers are made of a second metal material that has a "second sintering point." The second sintering point is a temperature that is higher than the first sintering point. Applicant has discovered that by using first and second metal materials as described, with a difference in the sintering points of the first and second metal materials, the described porous sintered bodies can be prepared by novel and inventive methods also described herein.

According to example methods of preparing a matrix by sintering, the matrix can be prepared from a blend of metal particles of two or more different metal materials, the blend including: powdered metal particles of the first metal material, having the first sintering point, which upon heating to a sintering temperature will form the connective metal nodes of the matrix; and elongate metal fiber particles of the second metal material, having the second sintering point, which will form the elongate metal fibers of the matrix. The blend of metal particles that includes the first metal material and the second metal material is first molded, before sintering, optionally and preferably in the absence of any organic material such as an organic binder. The blend of metal particles, while still in the mold, can be heated to a sintering temperature that is at least as high as the first sintering point, but that can be below the second sintering point.

The heating of the blend of metal particles causes sintering of at least one of the types of particles of the blend, to produce the sintered metal matrix. Specifically, the blend is heated to a sintering temperature that is below the melting temperature of both the first metal material and the second metal material, so that neither metal material of the blend will melt, i.e., liquefy, during the heating step. Instead of melting, the metal particles of powder of the first metal material, being heated to a temperature that is greater than the sintering point of the first metal material, reach a temperature that allows or causes the metal powder particles to adhere to, i.e., become bonded to or fused to, other particles of the blend, including the elongate metal fiber particles. Optionally and preferably, the temperature of the elongate metal fiber particles remains below the second sintering point.

Important to forming the metal matrix by sintering the blend of metal particles is the difference between the sintering point of the first metal material and the sintering point of the second metal material. That difference should be sufficiently great to allow the blend of two different metal materials to be heated to a sintering temperature at which particles of the metal powder of the first metal material will be sintered and bonded (or fused) to the elongate metal particles, without requiring or causing the elongate metal fiber particles to reach their sintering point (i.e., the sintering point of the second metal material).

According to certain example blends of metal particles as described, the second sintering point can be at least 50, 100, or 200 degrees Celsius greater than the first sintering point, for example the difference between the first sintering point and the second sintering point may be in a range from 250 to 350 degrees Celsius.

Non-limiting examples of first metal materials of a connective metal nodes of the matrix include stainless steel, other iron and steel alloys, nickel and nickel alloys, titanium and titanium alloys. The sintering point of the metal material of the connective metal nodes may be any sintering point that is below a sintering point of elongate metal fibers, as described herein. Examples of sintering points of metal materials such as stainless steel, other steel alloys, nickel, alloys of nickel, may be in a range from 530 to 900 degrees Celsius, e.g., from 530 to 630 degrees Celsius.

Examples of second metal materials useful for elongate metal fibers of the matrix include stainless steel, other iron and steel alloys, nickel and nickel alloys, titanium and titanium alloys. The sintering point of the metal material of the elongate metal fibers may be any sintering point that is above the sintering point of the first metal material, as described herein. Examples of sintering points of metal materials such as stainless steel, other steel alloys, for use as elongate metal fibers, may be in a range from 850 to 950 degrees Celsius, e.g., in a range from 850 to 1200, such as in a range from 900 to 1100 degrees Celsius.

The relative amount of the first metal material in the matrix, compared to the amount of the second metal material, can be any relative amount that will be effective to produce a porous sintered body as described, preferably that exhibits physical properties and filtering performance properties as described herein (e.g., porosity, surface area (BET), particle retention). Examples of useful relative amounts (by weight) of the first metal material to the second metal material, in a matrix, can be from about 30:70 to about 70 to 30. In some example matrixes, preferred amounts may be in a range from about 60:40 to about 40 to 60, or from about 45:55 to about 55:45. In these and other embodiments, the matrix does not require and may specifically exclude other metal materials, and any more than insubstantial amount of non-metal materials such as an organic binder. An example matrix can consist of or consist essentially of metal materials, e.g., the first metal material and the second metal material, to the exclusion of non-metal, organic materials. A matrix that is said to consist essentially of metal materials, e.g., the first metal material and the second metal material, refers to a matrix that contains the metal materials and not more than 1 percent by weight of any non-metal (e.g., organic) material based on the total weight of the matrix, such as not more than 0.5, 0.1, or 0.01 percent by weight non-metal material based on the total weight of the matrix.

For use as a filter membrane (a.k.a. "filter body"), especially for use in filtering a flow of gaseous fluid with a low flow rate, low pressure drop, and at approximately atmospheric or at a sub-atmospheric pressure, to achieve a high LRV removal efficiency, a porous sintered body can have various useful or preferred physical forms and properties including thickness, porosity, density, surface area (BET), and frontal area.

A preferred porous sintered body for use as a filter membrane can be relatively thin, e.g., have a thickness that is relatively small in magnitude. A reduced thickness can result in certain desired properties of a filter membrane including reduced mass and a reduced pressure drop across the filter during use. Additionally, when used in a vacuum, e.g., at sub-atmospheric pressure conditions, the reduced thickness (and, therefore, mass) of the filter membrane can reduce the potential of outgassing of any materials of the filter membrane into a flow of gaseous fluid that is being passed through the filter membrane for filtration. Accordingly, useful or preferred porous sintered bodies adapted for use as a filter membrane can have a thickness that is below 3 millimeters, e.g., below 2 millimeters, or below 1 millimeter, such as in a range from about 0.2 to about 1.5 or 1.7 millimeters. In contrast, various presently commercial porous sintered bodies used for filtering a gaseous fluid typically have a substantially greater thickness, e.g., a thickness of at least 3, 4, 5, or 6 millimeters. A greater thickness of a filter body may allow for use at relatively higher flowrates (e.g., greater than 50 standard liters per minute), while still achieving a high LRV, but would have drawbacks of a greater pressure drop and a greater mass.

A porous sintered body as described may have a porosity that will allow the porous sintered body to be effective for a desired use, e.g., as a filter membrane. For use as a filter membrane, especially for use in filtering a flow of gaseous fluid at a low flow rate, with a low or very low pressure drop, and at approximately atmospheric pressure or at sub-atmospheric pressure, the porous sintered body can preferably have a relatively high porosity, for example a porosity of at least 70 percent, e.g., a porosity in a range from 75 to 90 percent, such as in a range from 78 to 85 percent. As used herein, and in the art of porous sintered bodies, a "porosity" of a porous sintered body (also sometimes referred to as void fraction) is a measure of the void (i.e. "empty") space in the body as a percent of the total volume of the body, and is calculated as a fraction of the volume of voids of the body over the total volume of the body. A body that has zero percent porosity is completely solid.

The surface area of a porous sintered body as described can be any that will allow the sintered body to be effective for a desired use, e.g., as a filter membrane. For use as a filter membrane, especially for use in filtering a flow of gaseous fluid at a low flow rate, with a low pressure drop, and approximately atmospheric pressure or at a sub-atmospheric pressure, the porous sintered body can preferably have a surface area (BET) that will result in a desired removal efficiency (e.g., a LRV at least 3, 4, 7, or 9) measured at the most penetration particle size (MPPS) of 0.060 microns, when filtering a gaseous fluid passing through the porous sintered body at a flow rate that will be relatively low but still commercially acceptable, and with very low pressure drop across the filter. The methodology and techniques for determining the MPPS for filters is described in K W. Lee & B. Y. H Liu, *"On the Minimum Efficiency and the Most Penetrating Particle Size for Fibrous Filters,"* Journal of the Air Pollution Control Association Vol. 30, Iss. 4, 1980. With example porous sintered bodies of the present description, an example of a useful MPPS can be approximately 0.060 microns.

As is known in the porous body arts, surface area (BET) refers to a surface area of a porous body per mass of the body, calculated using the theory defined by Brunauer, Emmett and Teller, which involves physical adsorption of gas molecules on a solid surface. Without being a limit on the presently-described porous bodies, presently preferred surface area (BET) of a porous sintered body as described can be in a range from 0.25 to 0.60 meters squared per gram, for example from 0.3 to 0.5 meters squared per gram. Surface area (BET) values that differ from these ranges may also be useful depending on: other structural features of a particular porous sintered body; features of a gaseous flow being filtered; and desired particle removal efficiency (as measured by LRV).

A filter membrane made of a porous sintered body as described can include a useful frontal area, which can preferably be sufficiently high to allow for other performance features as described, including a low pressure drop as described, a low flow rate (per area) of fluid through the filter, and a desired removal efficiency (as measured by LRV). Exemplary porous sintered bodies can be constructed into a filter membrane that is in the form of a flat sheet, or alternately as a three-dimensional shape such as in the form of a cup, cone, tube, or closed-end tube (a.k.a. "closed cylinder," meaning a tube or cylinder having one closed end and one open end). A frontal area of a filter membrane as described (of any shape) refers to the area of the filter membrane through which a fluid passes during use. A particular example of a filter body can be a closed cylinder filter body having a length in a range from 3 to 10 inches, a diameter in a range from 0.75 to 2 inches, and a thickness in a range from 0.3 to 2 millimeters.

Optionally, and advantageously, a porous sintered body as described, having connective metal nodes made of the first metal material, and elongate metal fibers made of the second metal material, can have a relatively high ability to transfer heat. Due to the integral makeup that results from preferred methods of preparing the porous metal body by sintering, the matrix of the metal body is very highly interconnected, which provides a relatively good ability to transfer heat throughout the entire porous body. The relatively high heat transfer property can be useful or advantageous for applications of the porous sintered body as a filter membrane, with the filter membrane being heated during use to improve efficacy of the filter.

A porous sintered body as described can be used as a filter membrane to remove particles or contamination from a flow of fluid directed through the filter membrane. The fluid may be a gas or a liquid, with presently preferred examples of filter bodies being useful for filtering gaseous fluids. The gaseous fluid may be any gaseous fluid that requires filtering, including a gaseous fluid that contains an industrial chemical such as a gaseous chemical that will be used for processing or fabricating a semiconductor product or a microelectronic product. The porous sintered body may effectively remove particles from a fluid stream by a sieving or a non-sieving filtration mechanism. When the fluid is a gaseous fluid, filtration may predominantly occur by a non-sieving filtration mechanism.

The pressure of a gaseous fluid during a step of filtering the fluid using a filter membrane as described can be as desired, typically in a range that is approximately atmospheric pressure, or below atmospheric pressure. Examples of useful pressures (and considered to be approximately atmospheric) can be below 30 pounds per square inch (absolute) (psia), e.g., below 20 psia. For many filtering applications that supply a material to a semiconductor or microelectronic device processing system, the gaseous fluid is supplied at approximately atmospheric pressure or at sub-atmospheric pressure. For example, methods of the invention for filtering a gaseous fluid can include filtering a flow of gaseous fluid that has a pressure of not more than about 16 psia, e.g., in a range from 0.01 to 15.5 psia.

Figure 1:
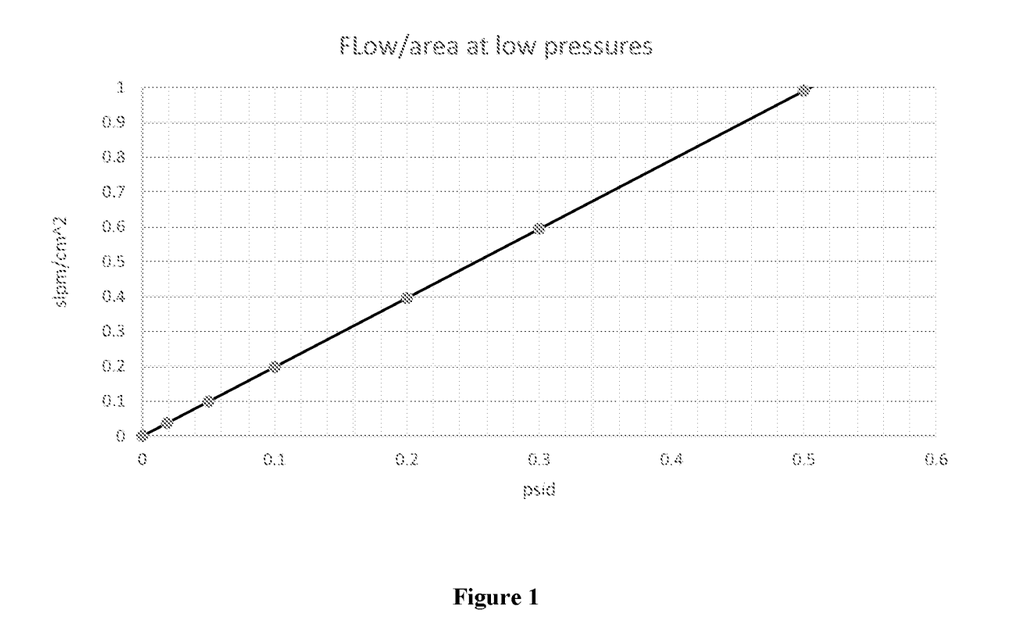
FIG. 1 is a graph of rates of flow through a filter membrane as described, at a low pressure differential.

A pressure differential (or "pressure drop") across a thickness of a filter membrane as described (between an upstream side of the filter and a downstream side of the filter), during use of the filter membrane, can be any pressure differential that allows for desired effectiveness (e.g., particle retention) during the filtering step (e.g., of a given flow rate of fluid), and that is also commercially feasible. Using relatively low flow rates of gaseous fluid, with a highly porous filter membrane having a low thickness, a preferred method of the present description can result in a relatively low pressure differential. For various applications of filtering a chemical for use in processing a semiconductor or microelectronic device, a pressure differential across the filter membrane can be below about 5 pounds per square inch differential (psid), preferably below about 2, 1, 0.5, or below 0.3, 0.1, or 0.05 pounds per square inch differential (psid), while still allowing for a useful flow of the fluid through the filter. FIG. 1 shows example rates of flow per area at low pressure differentials, by use of example filter membranes as described herein.

The amount of a gaseous fluid flowing through a filter membrane during a filtering step can be an amount that allows for desired effectiveness (e.g., particle retention) during the filtering step, and that is also commercially feasible. For various applications in filtering a chemical for use in processing a semiconductor or microelectronic device, a flow of fluid (as expressed in volume of flow per time, per frontal area of the filter) through the filter membrane can be below about 5 standard liters per minute (slpm) per square centimeter, e.g., below 2, 1, 0.5, 0.3, 0.2, or 0.1 slpm per square centimeter. As an example of a useful or preferred filter configuration, a filter membrane having a thickness that is below 1 millimeter (e.g., a thickness of about 0.7 millimeter) and a porosity that is below 90 percent (e.g., 81.5 percent), may allow for a flow rate of a fluid (e.g., air as a test fluid, at 20 degrees Celsius), of at least 10 standard liters per minute per square centimeter. This flow rate, relative to filter membrane properties, may be a reference of a flow property of a porous membrane as described relative to the membrane properties, or relative to other comparable filter membranes (with similar or with alternate physical properties); a flow rate through the filter membrane during use may be substantially lower.

The temperature of a flow of fluid through a filter membrane as described can be any temperature that allows for commercially effective filtering. For various applications of filtering a chemical for use in processing a semiconductor or microelectronic device, a temperature may be about room temperature (e.g., 30 degrees Celsius), or higher, for example a temperature of at least 100, 150, or 200 degrees Celsius.

Figure 2:
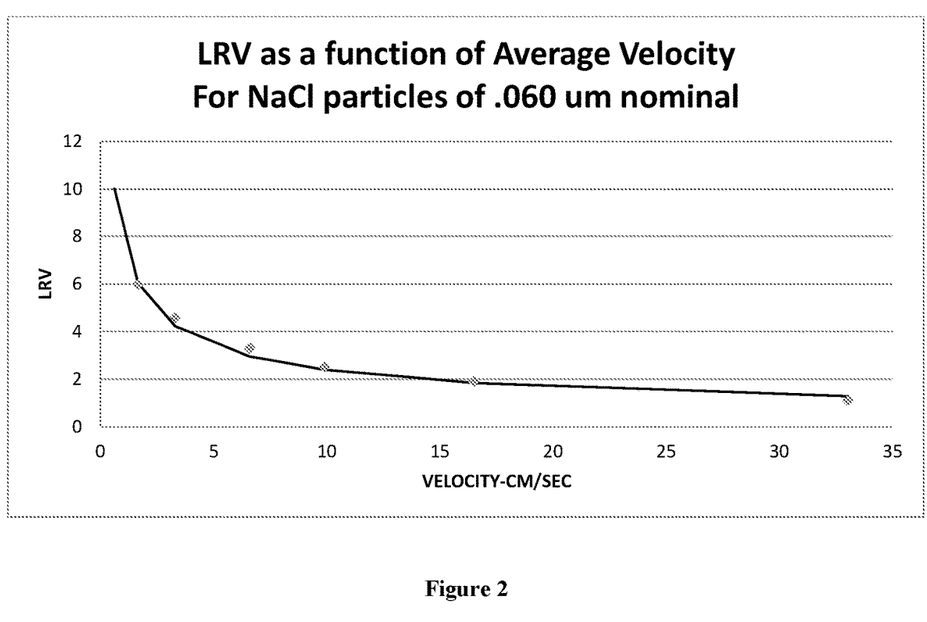
FIG. 2 is a graph of filter efficacy (in terms of LRV) relative to flow velocity, for a filter membrane as described.

During a filtering step, the gaseous fluid may be provided at any flow rate and at any pressure, consistent with the present description and as will be suitable for use with the filter membrane to achieve desired filtration performance, including removal efficiency. For presently useful or preferred filtering methods, gaseous fluid may be flowed through the filter membrane at a relatively low flow rate and at a low pressure, such as a pressure in a range of about 1 atmosphere, or below one atmosphere. The removal efficiency can preferably be relatively high, such to result in a log reduction value of at least 3, 4, 5, 7, or 9, for particles of 0.060 micron (MPPS). The graph at FIG. 2 shows particle removal efficacy versus flow velocity (for 0.060 micron particles).

With the present sintered metal bodies used as a filter membrane, and based on selected (relatively low) flow rate of a gaseous fluid through the filter membrane, example methods of the invention can achieve a filtration efficiency ("removal efficiency") of at least 3, 4, 5, 7, or 9, measured as log reduction value ("LRV"). Log reduction value (LRV) is defined as the log of the ratio of two numbers and can be used to characterize the particle retention properties of a porous membrane. In the present case, the ratio is that of the number of particles impacting the filter membrane on the upstream side of the filter, during filtration, to the number of particles detected downstream of the filter. Accordingly, an LRV value of 7 refers to a challenge of $10^7$ particles and the detection of 1 particle downstream, the log of this ratio being 7. The test is conducted by generating an aerosol containing several million particles with a size distribution centered around 0.060 microns, passing this aerosol through the filter made from the porous sintered body in versions of the invention and counting the number of particles that pass using a condensation nucleus counter (CNC). The LRV value of a filter membrane will depend on the rate of the flow of gaseous fluid through the filter membrane. A higher LRV value can be achieved at lower rates of flow. In versions of the porous sintered body, the LRV is greater than 3, 4, or 5 when several million particles with a size distribution centered around 0.060 microns as an aerosol is used to challenge the porous sintered body. In some other versions the LRV of the porous sintered body is between 6 and 9 when several million particles with a size distribution centered around 0.060 microns as an aerosol is used to challenge the porous sintered body. In still other versions of the porous sintered body, the LRV of the porous sintered body is between 7 and 9 when several million particles with a size distribution centered around 0.060 microns as an aerosol is used to challenge the porous sintered body. FIG. 2 is a graph showing a non-limiting example of filter efficacy of a filter membrane as described, versus velocity.

The type of fluid that can be effectively filtered by a filter membrane as described may be any type fluid that is desirably filtered to remove a high proportion of any particle or other type of contaminant or undesired material from the fluid, for example to use the fluid, typically a gaseous fluid, in a process of manufacturing a semiconductor device or microelectronic device, including a device precursor. The fluid is typically provided at a low pressure, such as a pressure that is approximately atmospheric, or sub-atmospheric, and may be provided and used at a low flow rate as described herein. Illustrative examples include the following non-limiting gases: silane, methyl silane, trimethyl silane, hydrogen, methane, nitrogen, carbon monoxide, diborane, $BP_3$, arsine, phosphine, phosgene, chlorine, $BCl_3$, $BF_3$, $B_2H_6$, $B_2D_6$, tungsten hexafluoride, hydrogen fluoride, hydrogen chloride, hydrogen iodide, hydrogen bromide, germane, ammonia, stibine, hydrogen sulfide, hydrogen cyanide, hydrogen selenide, hydrogen telluride, deuterated hydrides, trimethyl stibine, phosphorous trifluoride, arsenic pentafluoride, tetraethyl orthosilicate, halide (chlorine, bromine, iodine, and fluorine), gaseous compounds such as $NF_3$, $ClF_3$, $GeF_4$, $SiF_4$, $AsF_5$, organo compounds, organometallic compounds, hydrocarbons, and organometallic Group V compounds such as $(CH_3)_3Sb$. For each of these compounds, all isotopes are contemplated. Commonly, one or more of these gases species are handled in combination with a carrier gas such as an inert gas.

Figure 3A:
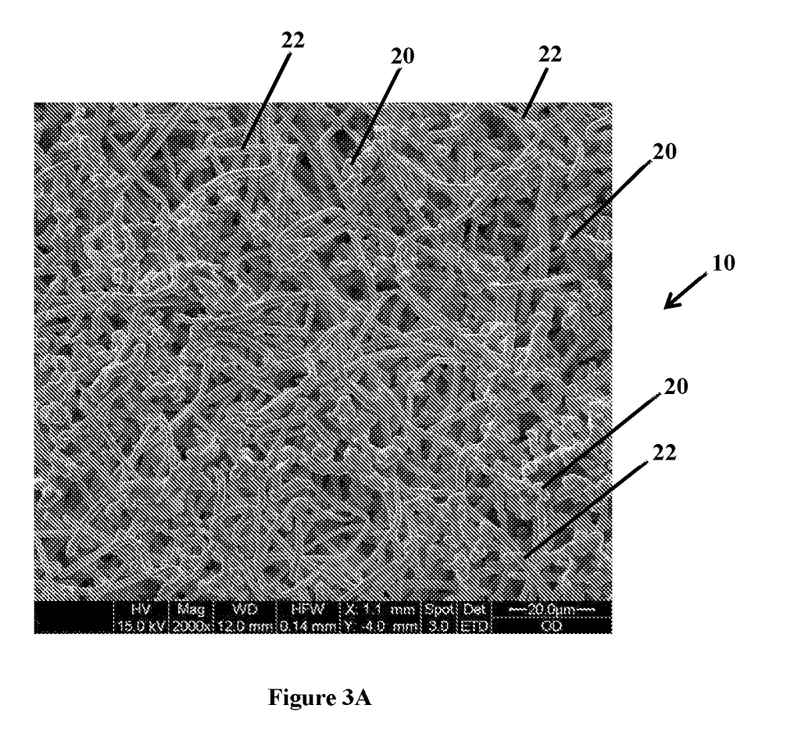
FIGS. 3A, 3B, and 3C are photomicrographs of a matrix as described.
Figure 3B:
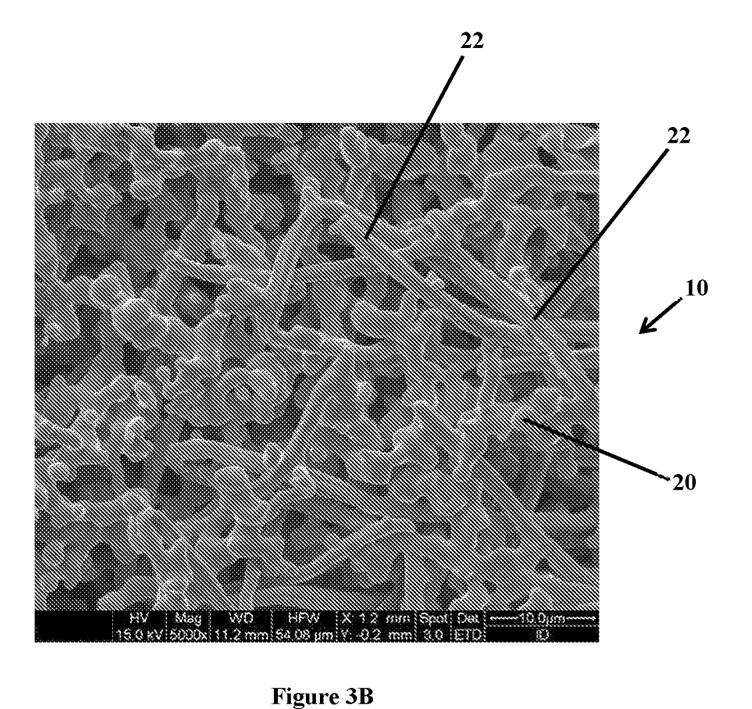
Figure 3C:
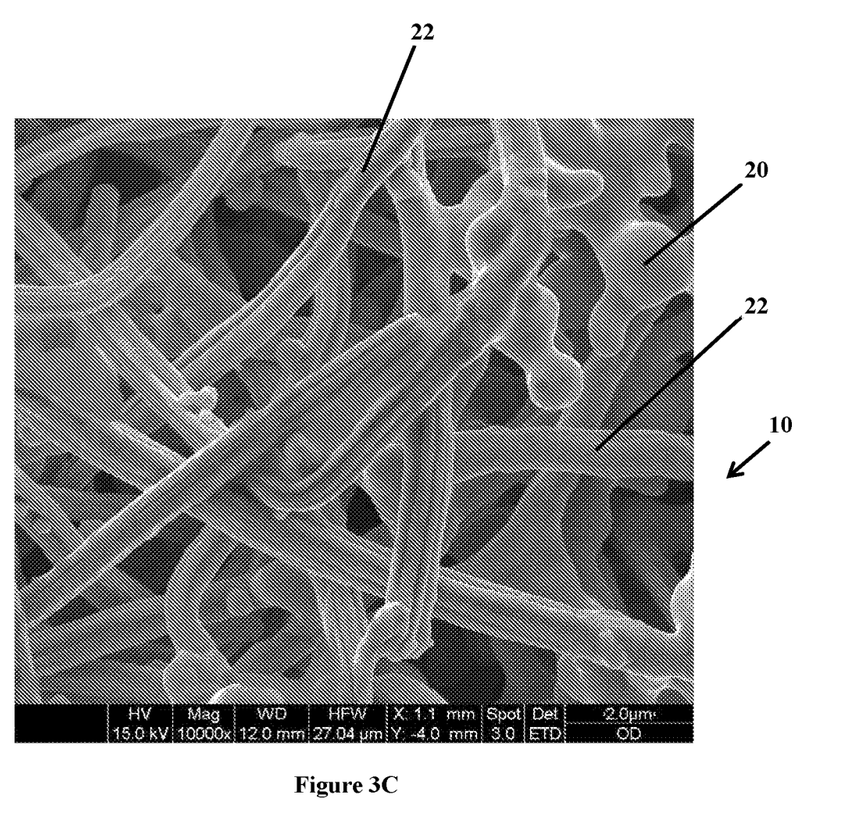

According to example methods of preparing a sintered metal body as described, containing a metal matrix as described, the sintered metal body can be prepared by molding and sintering a blend of two different types of metal particles. A first type of metal particle is a collection of powdered metal particles of a first metal material that has a first sintering point. The second type of metal particle is a collection of elongate metal fiber particles of a second metal material having a second sintering point that is higher than the first sintering point. Generally, the two types of particles are blended to form a uniformly-blended mixture of the particles. The blend of metal particles can then be molded to form a desired shape, then heated to a sintering temperature that is greater than the first sintering point and (preferably) below the second sintering point. Heating of the blend of metal particles causes sintering of the first type of metal particles, having a powdered form. The metal particles of the first metal material reach a temperature, above the first sintering point, that allows or causes the powder particles to adhere to, i.e., become bonded or fused to, other particles of the blend, including the elongate metal fiber particles. The metal particles of the powder, which become adhered or fused to surfaces of the metal fiber particles, become the connective metal nodes of a sintered metal matrix as described herein, securely bonding the metal fiber particles together by metal connections of the first metal material at the nodes. Referring to FIGS. 3A and 3B, photomicrographs of matrix 10, metal connective nodes 20 can be seen connecting elongate metal fibers 22.

The first metal particles, i.e., the "powder particles" or "metal powder particles," can be selected to exhibit size and shape properties, and a desired sintering point, that will allow the metal powder particles to be useful in preparing a sintered metal body as described, with the metal powder particles being sintered during a sintering step to fuse to other particles of the blend (including the elongate metal particles) to form the connective metal nodes of the sintered matrix. The first metal particles can be made of a first metal material that exhibits a desired sintering point (i.e., a "first sintering point"), with the metal material being selected from iron, chromium, nickel, and alloys or combinations of these. A preferred first metal material can be a nickel alloy.

The first metal particles are in the form of a powder, which refers to a collection of small (micron or sub-micron scale) particles of the first metal material. The metal particles of a powder can have shapes that allow for their use in a blend as described, and in a method as described, that will be effective for the particles to form the connective metal nodes of a matrix upon sintering. The shapes of first metal particles of a metal powder can be substantially rounded, e.g., globular, or irregular and slightly branched, with aspect ratios of individual particles that do not exceed about 5:1, e.g. The particles can have a useful particle size (average particle size), for example an average particle size in a range that is below 20 or 10 microns, e.g., in a range between about 1 to 3 microns.

The powder of the first metal particles may have any useful apparent density (AD). A powder having a relatively low AD can typically be useful or preferred for producing a sintered matrix as described, that will exhibit a high porosity, by molding and sintering a blend of the first metal particles and the second metal particles. For example, a powder of the first metal particles used in a blend as described may have an apparent density that is below 1 gram per cubic centimeter (g/cc), e.g., below 0.90, 0.80, or below 0.70 g/cc. As is known, an apparent (bulk) density of a powder or granules refers to the mass of the powder or collection of granules for a given volume, with the volume including intermediate and hollow spaces. Methods for measuring apparent (bulk) density are well known, and include ASTM B703-17 "Standard Test Method for Apparent Density of Metal Powders and Related Compounds Using the Arnold Meter."

The second metal particles, which are elongate, can be selected to exhibit size and shape properties and a desired sintering point that will allow the second metal particles to be useful in preparing a sintered metal body as described. The second metal particles are not required to be sintered during a sintering step that is effective to cause the first metal particles to become sintered to form the connective metal nodes of a sintered metal matrix; the second metal particles may optionally experience some degree of sintering, but sintering of the second metal particles is not required. The second metal particles can be made of a second metal material that exhibits a desired sintering point (i.e., a "second sintering point"), with the metal material being selected from iron, chromium, nickel, and alloys or combinations of these. A preferred second metal material can be an iron alloy such as a type of stainless steel.

The second metal particles are in the form of a collection of small (micron or sub-micron scale) particles, with the particles being shaped to include an elongate axis; the particles may be considered to have the form of a "fiber"

(a.k.a. "strand," "pillar," "filament," or the like). The second metal particles can have shapes that allow for their use in a blend as described, and in a method as described, that will be effective to form metal fibers of a sintered metal matrix connected together by the connective metal nodes of the matrix. The second metal particles are elongate, may have an aspect ratio (ratio of length to width) that is at least 10:1, e.g., at least, 20:1, for example in a range from 25:1 to 125:1. The particles can have a useful particle size (average particle size), for example an average particle diameter in that is below 10 or 20 microns, e.g., in a range between about 1 to 3 microns.

A collection of the second metal particles may have any useful apparent density (AD), and can preferably have an apparent density that is relatively low, to facilitate producing a sintered matrix as described, and that exhibits a high porosity. For example, a collection of the second metal particles used in a blend as described may have an apparent density that is below about 0.5 g/cc, e.g., below 0.40, 0.30, or below 0.20 g/cc.

To produce a sintered metal matrix from the first and second metal particles, the first metal particles and the second metal particles are blended together to form a mixture of the particles, dispersed in a substantially uniform manner. The blend can include (e.g., comprise, consist of, or consist essentially of) the first metal particles and the second metal particles in any relative amounts that are effective to produce a sintered body as described. Examples of useful relative amounts (by weight) of the first metal particles to the second metal particles in a blend can be from about 30:70 to about 70 to 30. In some example matrixes, preferred amounts may be in a range from about 60:40 to about 40 to 60, or from about 45:55 to about 55:45. A blend of metal particles that consists essentially of metal materials, e.g., the second metal material and the first metal material, refers to a blend of metal materials that does not contain more than an insubstantial amount of any other material, such as a non-metal (organic) material, for example an organic binder, e.g., not more than 1 percent by weight organic material based on the total weight of the blend (as molded and sintered), or not more than 0.5, 0.1, or 0.01 percent by weight of organic material based on the total weight of the blend (as molded and sintered).

The first and second metal particles are combined to produce a collection ("powder") that includes the two different types of metal particles, and the blend can then be molded and sintered. When the two types of metal particles are initially combined, the blend will have an apparent density (AD) that is intermediate of the apparent density of the first metal particles and the second metal particles. The AD can be, for example, in a range from about 0.2 to 0.7, e.g., between 0.3 and 0.6 grams per cubic centimeter (e.g., using ASTM B703-17).

The blend can be placed into a mold and compressed to a desired extent. In a mold, the density of the blend, i.e., the "mold density," may be in a range from about 0.3 to 0.8, e.g., from 0.4 to 0.7 grams per cubic centimeter. These ranges of mold density can be similar to a "tap density" of the blend, which is a density measurement that is known in the metal powder arts. Methods for measuring tap density are well known, and include ASTM B527-15 "Standard Test Method for Tap Density of Metal Powders and Compounds."

The mold used for molding the blend can be any form of mold, and can be of a material that, upon sintering of the blend within supporting structures of the mold, will not result in a substantial amount of adherence between the sintered blend and the supporting structures of the mold.

Advantageously, relative to other methods of forming a porous sintered body, a blend as described can be formed, molded, and sintered, within a mold, without the need for an organic material such as an organic binder to be included in the blend. Also, advantageously, the blend can be formed into a molded (un-sintered) body in a mold and sintered in the same mold, without removing the un-sintered molded body from the mold to a different location for sintering. According to previous methods of forming porous sintered bodies, an organic binder is often or typically used, because the method includes a step of forming the body in a mold, and then removing the un-sintered body from the mold, and placing the un-sintered body at a different location such as a support (e.g., a mandrel or rod) at which location the molded body can then be sintered.

In contrast, example methods for forming a sintered metal body of the present description, e.g., a filter membrane, such as, but not necessarily in the form of a closed cylinder, can include providing a blend as described generally herein, e.g., including first metal particles in the form of a metal powder of a nickel alloy, and second metal particles in the form of elongate stainless steel particles. The first and second particles can be blended and then formed using a tubular (closed cylinder) mold, into a thin-wall high-porosity, low apparent density molded form. The molded form is heat treated, in the supporting structure of the mold, so that the first metal material (e.g., a nickel alloy) is well sintered, while the second metal material (e.g., a stainless steel alloy) is largely unchanged. The first metal material fuses to the second metal material to produce connective metal nodes of the first material that form a metal bond between the stainless steel elongate fibers of the second metal material, to form a self-supporting sintered metal matrix body.

The invention claimed is:

1. A porous sintered metal body comprising a metal matrix comprising elongate metal fibers connected at connective metal nodes, the matrix comprising:
   connective metal nodes comprising a first metal material having a first sintering point;
   elongate metal fibers of a second metal material having a second sintering point that is greater than the first sintering point;
   wherein the first metal material and the second metal material are different, and wherein the connective metal nodes are fused to the elongate metal fibers without the elongate metal fibers being fused to each other to form an interconnected metal matrix comprising the elongate metal fibers connected by and extending between the connective metal nodes.

2. The porous sintered metal body of claim 1 comprising:
   from 30 to 70 weight percent of the first metal material, and
   from 70 to 30 weight percent of the second metal material.

3. The porous sintered metal body of claim 1 comprising less than 1 weight percent non-metal material.

4. The porous sintered metal body of claim 1 wherein the second sintering point is at least 200 degrees Celsius higher than the first sintering point.

5. The porous sintered metal body of claim 1 wherein the first sintering point is in a range from 530 to 630 degrees Celsius.

6. The porous sintered metal body of claim 1 wherein the first metal material is nickel or a nickel alloy.

7. The porous sintered metal body of claim 1 wherein the second metal material is stainless steel.

8. The porous sintered metal body of claim 1 having a porosity in a range from 70 to 90 percent.

9. The porous sintered metal body of claim 1 having a surface area defined by the Brunauer, Emmett and Teller (BET) theory of at least 0.30 meter$^2$ per gram.

10. The porous sintered metal body of claim 1 having a thickness that is less than 1 millimeter.

11. The porous sintered metal body of claim 1 in the form of a closed cylinder.

12. A method of forming a metal matrix that includes elongate metal fibers connected at connective metal nodes, the method comprising:

providing a blend of metal particles including powdered metal particles of a first metal material having a first sintering point, elongate metal fiber particles of a second metal material having a second sintering point, and with the second sintering point being above the first sintering point, wherein the first metal material and the second metal material are different; and sintering the blend at a temperature that is above the first sintering point and below the second sintering point to sinter the powdered metal material to the elongate metal fiber particles but not cause the elongate metal fiber particles to sinter to each other and form a metal matrix comprising the elongate metal fibers connected at connective metal nodes formed by sintering the powdered metal particles.

13. The method of claim 12 comprising:

placing the blend in a mold;

pressing the blend, in the mold and sintering the blend in the mold.

14. The method of claim 13 wherein the blend of metal materials has an apparent density of less than 0.5 grams per cubic centimeter before being placed in the mold.

\* \* \* \* \*